United States Patent
Susel et al.

(10) Patent No.: US 9,613,464 B2
(45) Date of Patent: Apr. 4, 2017

(54) SYSTEM AND METHOD TO SELECT AND CHARACTERIZE BUILDING FLOORS USING 2D REPRESENTATIONS

(71) Applicant: Honeywell International Inc., Morristown, NJ (US)

(72) Inventors: Michele Susel, Trieste (IT); Daniel Merli, Trieste (IT); Giuseppe Premarini, Trieste (IT)

(73) Assignee: LIFE SAFETY DISTRIBUTION AG, Hegnau (CH)

( * ) Notice: Subject to any disclaimer, the term of this patent is extended or adjusted under 35 U.S.C. 154(b) by 176 days.

(21) Appl. No.: 14/248,542

(22) Filed: Apr. 9, 2014

(65) Prior Publication Data
US 2015/0294509 A1 Oct. 15, 2015

(51) Int. Cl.
| | |
|---|---|
| G06T 17/00 | (2006.01) |
| G06T 19/20 | (2011.01) |
| G09B 29/10 | (2006.01) |
| G06T 17/10 | (2006.01) |
| H04W 16/20 | (2009.01) |

(52) U.S. Cl.
CPC .............. *G06T 19/20* (2013.01); *G06T 17/10* (2013.01); *G09B 29/106* (2013.01); *H04W 16/20* (2013.01); *G06T 2207/20092* (2013.01); *G06T 2210/04* (2013.01); *G06T 2215/16* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 6,219,679 | B1* | 4/2001 | Brisebois | G06F 17/30855 |
| | | | | 707/E17.013 |
| 2006/0277501 | A1 | 12/2006 | Plocher et al. | |
| 2007/0096901 | A1* | 5/2007 | Seeley | G08B 25/009 |
| | | | | 340/539.18 |
| 2007/0132756 | A1* | 6/2007 | Plocher | G06F 3/04815 |
| | | | | 345/420 |
| 2007/0219645 | A1 | 9/2007 | Thomas et al. | |
| 2011/0176179 | A1* | 7/2011 | Judelson | G06T 19/00 |
| | | | | 358/448 |

(Continued)

OTHER PUBLICATIONS

Extended European search report for corresponding EP application 15160850.2, dated Jun. 19, 2015.

*Primary Examiner* — Kyle Zhai
(74) *Attorney, Agent, or Firm* — Husch Blackwell LLP

(57) ABSTRACT

A system includes a two dimensional display device coupled to control circuitry. The control circuitry establishes a two dimensional representation of at least first and second floors of a building. Responsive to a selected input, closed boundaries are established that surround the two dimensional representations of each floor. Responsive to at least one other input, first and second coordinate systems are established with one coordinate system associated with each boundary. Three dimensional information can be established relative to the various devices installed on each floor, and simulations of operation can be carried out. An installer can move various ones of the devices and re-run the simulation to evaluate which configuration provides a better communication result.

20 Claims, 4 Drawing Sheets

(56) References Cited

U.S. PATENT DOCUMENTS

| | | | |
|---|---|---|---|
| 2011/0183685 A1* | 7/2011 | Burton | G06F 21/316 455/456.1 |
| 2013/0083012 A1* | 4/2013 | Han | G06F 3/048 345/419 |
| 2014/0132640 A1* | 5/2014 | Sharma | G09B 29/005 345/661 |
| 2014/0330541 A1* | 11/2014 | Natarajan | G06F 17/5004 703/1 |

* cited by examiner

SYSTEM AND METHOD TO SELECT AND CHARACTERIZE BUILDING FLOORS USING 2D REPRESENTATIONS

FIELD

The application pertains to systems and methods to facilitate installation of wireless devices in buildings. More particularly, the application pertains to such systems and methods in which only a two dimensional display device is needed to visualize and install such devices in a multi-story building.

BACKGROUND

Installers of alarm indicating or monitoring systems may rely on one or more two dimensional drawings illustrating floor plans of various floors of a building. Such drawings or diagrams may need to be related to three dimensional information pertaining to the building.

For example, information pertaining to vertical distances between floors or relative to a distance to ground level may be of importance. Further, the relationships of objects, such as alarm indicators or various types of detectors on different floors, may be important.

Commonly available tools, such as laptop computers or tablet computers, usually include two dimensional displays. From cost and convenience perspectives, it would be advantageous to be able to address three dimensional issues in connection with building installations using the two dimensional displays of such commercially available tools.

DETAILED DESCRIPTION

Figure 1:
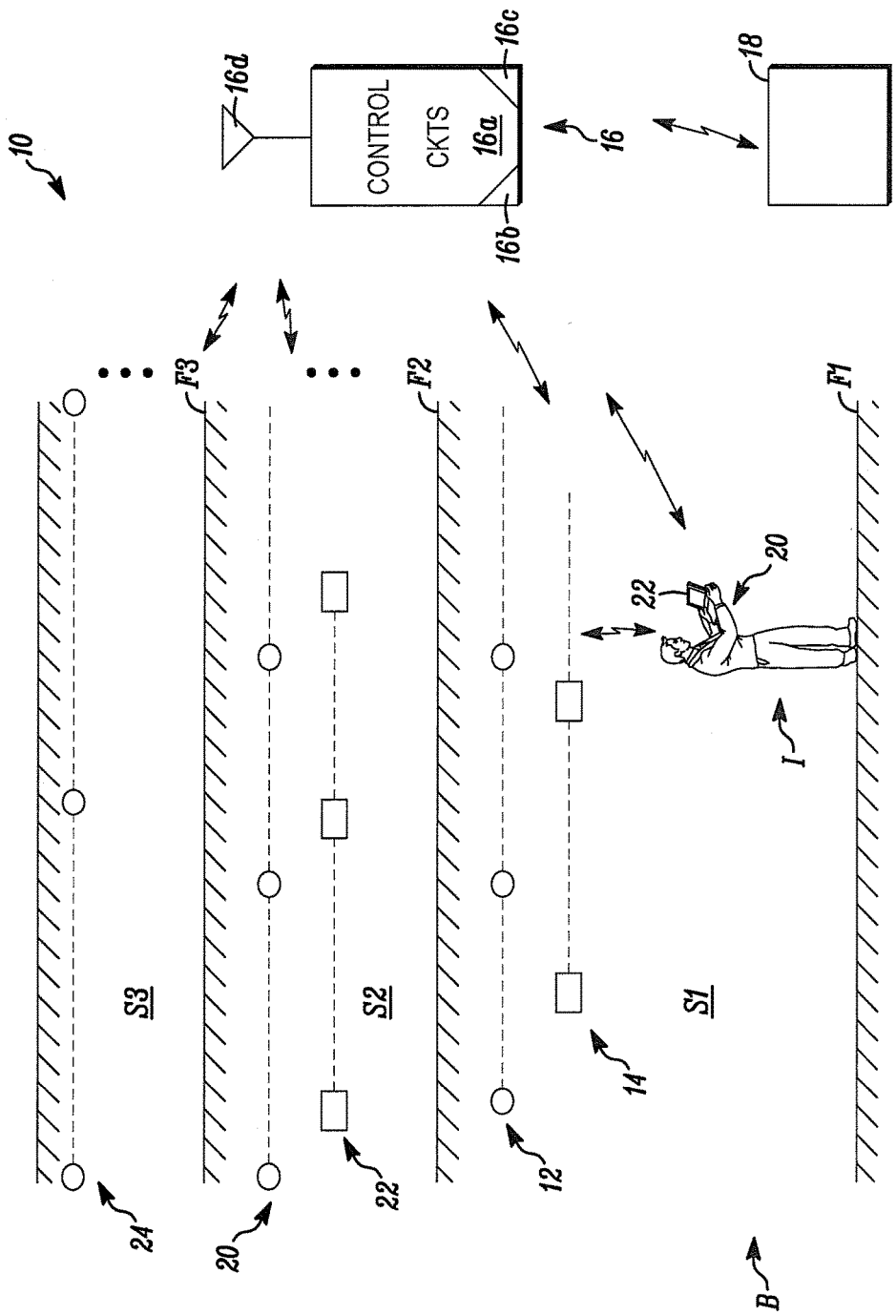
FIG. 1 is a diagram of a system in accordance herewith.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

In embodiments hereof, an installer can use a computer, a tablet PC, or a laptop, for example, which is executing a software tool to plan the installation of a system of wireless devices in a building. For example, a single two dimensional floor plan map or representation can be displayed on the computer screen. Such images can be created by importing, mixing, or editing the respective two dimensional drawings.

The user is then able to interact with the display and to choose the positions of wireless devices and other objects that could affect transmissions in the radio system. The quality of the radio communication between the devices can be simulated and evaluated.

A variety of inputs can be provided in order to implement such simulations. These include, without limitation, the locations and types of wireless devices and other objects, such as speakers or alarm indicating output devices, along with other inputs that can be requested of or by a user, including, for example, metric or other types of reference systems and the types of environments.

As those of skill will understand, the accuracy of such simulations depends on the accuracy of the location information, such as Cartesian coordinates of the devices and objects in or being installed in the region of interest.

Embodiments hereof also provide to the user capabilities to view and manipulate parts of the site belonging to different floors of the building. For example, floor information can be used to translate devices and objects from a two dimensional space to a three dimensional space to improve simulation accuracy.

In yet another aspect, an easy to use graphical method is provided by which a user can assign representations, devices, or objects to various floors of a building.

FIG. 1 illustrates a system 10 in accordance herewith. FIGS. 2-7 illustrate aspects of exemplary methods in accordance herewith.

The system 10, as in FIG. 1, illustrates a side sectional view of a portion of a building B with three floors F1, F2, and F3. Spaces S1, S2, and S3 are defined between each respective floor and the associated ceiling.

Pluralities of detectors, such as 12, 20, 24, are illustrated installed in the respective spaces S1, S2, S3. Output devices 14, 22 of various types are scattered through the respective spaces S1, S2. The following comments apply equally to the space S3 and the associated detector 24. Those of skill will understand that no further specific discussion of the space S3 is needed. Further, the number of floors of FIG. 1 is exemplary only and not a limitation hereof.

The various types of devices 12, 14, 20, 22, and 24 can communicate wirelessly with a local control system 16. The control system 16 includes control circuits 16a that can be implemented, at least in part, with a programmable processor 16b and executable control instructions 16c. An antenna 16d facilitates communication with the various detectors and output devices.

The control system 16 can be in wireless communication via the Internet or intranet with a displaced monitoring station 18. As those of skill will understand, a wired control system (similar to the system 16, but wired to at least some of the detectors) can be coupled via cable or wires to a gateway. The gateway can, in turn, provide wireless communication to other devices or detectors as needed.

An installer I is illustrated with a computer 20 that has a two dimensional display unit 22. The computer and display unit 22, as discussed below, can be used to assist in a system installation or modification process. It will be understood that the installer I need not be inside of the building B.

Figure 2:
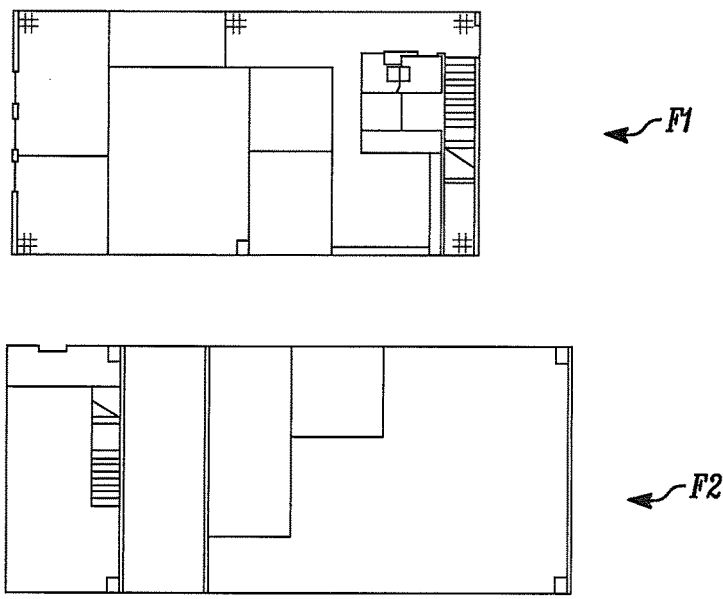
FIG. 2 illustrates aspects of an exemplary process.

With respect to FIG. 2, the installer's computer 20 shows on its interface or display unit 22 two dimensional plan views of two floors F1, F2 of the building B where the installer I is operating. As those of skill will understand, the installation process can include determining the placement of various types of devices or objects, such as smoke detectors, gas detectors, monitoring devices, such as intrusion detectors or glass break detectors 12, 20, 24, alarm indicating output devices, such as audible output devices 14, 22 or speakers, or the like all without limitation. The effects of obstacles, which might alternate or interfere with the wireless RF signals, can also be taken into account in the simulation of communication between wireless devices.

Figure 3:
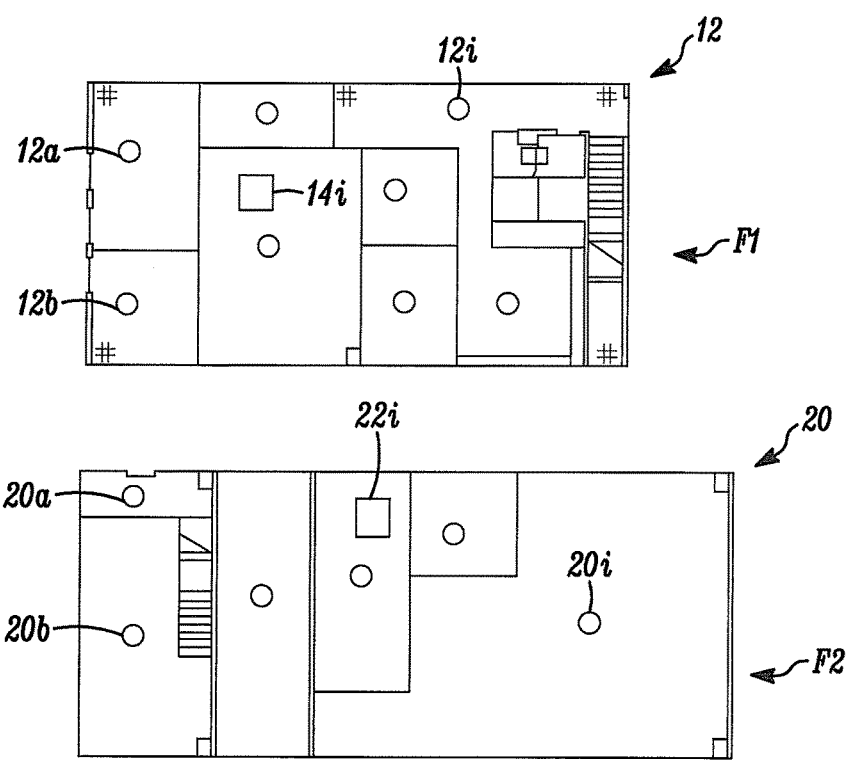
FIG. 3 illustrates installed devices in an exemplary building.

FIG. 3 illustrates floors F1 and F2 with locations specified for various types of ceiling mounted detectors, output devices, or the like 12, 14, 20. The installer I has specified locations where wireless devices will be installed or where they are already installed, for example, usually on the respective ceiling in the case of smoke detectors, but gas detectors are not always ceiling mounted.

Devices, for example, smoke or gas detectors, as in FIG. 3, are represented by circles. Output devices, such as 14*i* and 22*i*, are represented by squares. It will be understood that the symbols used to represent the various devices are exemplary only and do not reflect a limitation hereof. Different shapes or coloring of symbols can be used to indicate different types of devices and/or overall functions, such as input devices and output devices all without limitation.

Figure 4:
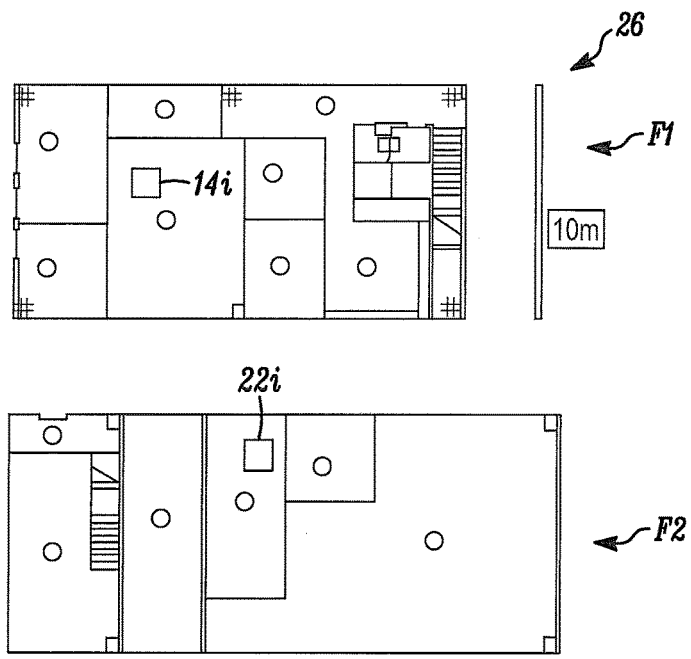
FIG. 4 illustrates establishing a distance reference.

In FIG. 4, a distance reference 26 has been associated with the floors to facilitate conversion of displayable pixels to distance, for example, meters.

Figure 5:
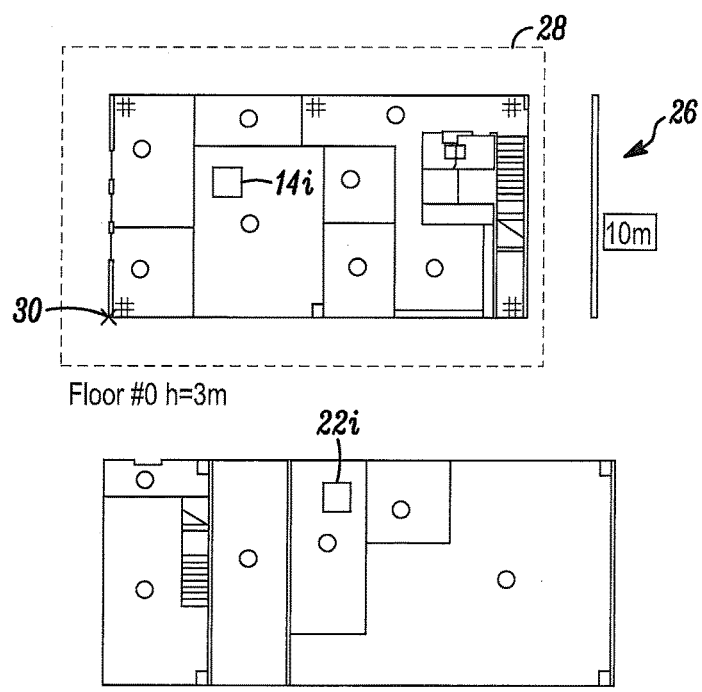
FIG. 5 illustrates selecting a first floor.

FIG. 5 illustrates designating a floor, such as F1, on the display. In this regard, the installer has selected the upper part of the display by enclosing it in a closed rectangular region 28. This region corresponds to the first floor F1 of the building B and is indicated by "Floor #0".

It will be understood that the exact shape of the boundary regions is not a limitation hereof. Boundary regions of different shapes could also be used.

An origin AP0 for a coordinate system 30 is established at the left-bottom corner of the floor F1. The installer can also set additional parameters for the floor F1. For example, a ceiling height of three meters can be specified as noted by the point 30.

Figure 6:
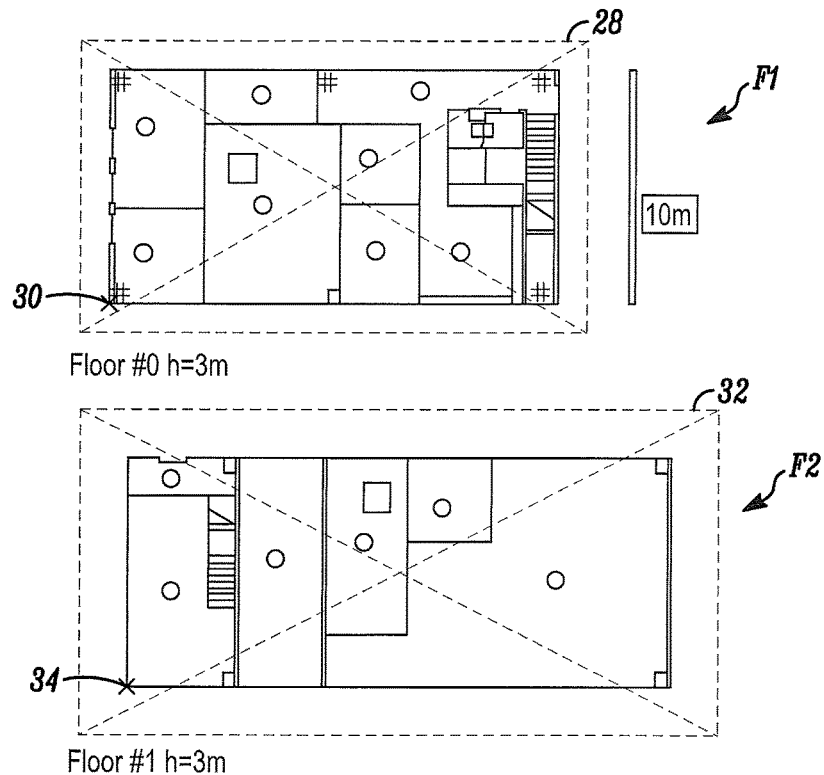
FIG. 6 illustrates selecting a second floor.

In FIG. 6, the second floor F2 can be selected by the installer by enclosing it in a different closed rectangular region 32. The installer can specify that the lower part of the display is related to the second floor, which is indicted by "Floor #1". An origin AP1 for a second coordinate system 34 can be specified in the left-bottom corner of the floor F2. The installer can also set additional parameters, for example, the ceiling height as an exemplary three meters, as indicated below the origin point 34.

Figure 7:
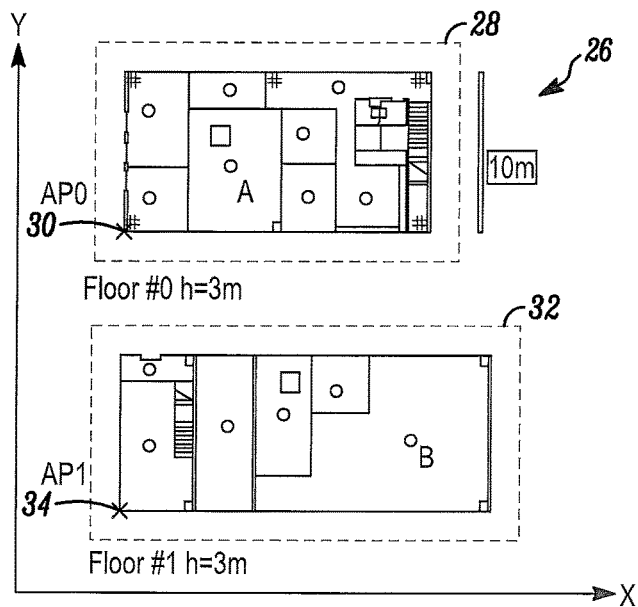
FIG. 7 illustrates locating first and second origins of coordinate systems relative to a respective floor image.

With respect to FIG. 7, the installer can carry out various simulations given the information relative to the floors F1, F2 on the display 22. The positions of devices installed on the two floors F1, F2 can be converted from two dimensional representations to three dimensional using information associated with each of the floors and the alignment points AP0 and AP1.

For example, consider, as in FIG. 7, the devices designated A and B and the alignment points AP0 (first floor) and AP1 (second floor). The coordinates X, Y (pixel) of A are decreased by the coordinates X, Y of AP0. If A is at (100,300) and AP0 is at (50,280), then the new coordinates of A are (50,20). Then, the coordinates are converted to meters using the metric reference 26 (conversion from pixel to meter). For example, (50,20) pixels becomes (8, 3.2) meters.

The Z coordinate of A is established starting from 0 meters and adding the heights of the floors under the floor of A. Since A is on the first floor, the vertical distance Z of A remains 0. Then, with device A installed on the ceiling of the room, the height parameter Z is increased by the height of the room that is the height of the first floor (3 m). The final three dimensional coordinates of A are then (8, 3.2, 3). The same process can be used for device B and, in this case, the AP1 coordinates and the first floor height are considered. Similar comments apply to the floor F3.

An exemplary form of conversion from two dimensional information to three dimensional can be implemented as follows. Let the two dimensional position of the device or object i on the two dimensional map representation be stored as $X_i, Y_i$ in pixels (the axis of origin could be any point inside or outside of the two dimensional map representation). Search which floor k contains the device or object i, that is, which selected shape k contains the device or object i. Decrease $X_i$ by the X-value of the alignment point k. Decrease $Y_i$ by the Y-value of the alignment point k.

Convert $X_i$, $Y_i$ from pixels to meters using the metric reference 26. Evaluate $Z_i$ starting from a default value (for example, 0 meters) and increasing it by the ceiling height of the floors $[H]_j$ that are under the floor k, considering their order [OR]. Based on the device or object type, parameters, or characteristics (for example, mounting place), an additional value can be added to $Z_i$. At the end of the process, all devices or objects i have three dimensional $(X_i, Y_i, Z_i)$ assigned coordinates (meters) representing the position in a three dimensional space of the device or object i.

In summary, starting from the screen with the two dimensional map representation, the user graphically selects a region thereof to identify a floor. The selection shape can be any type of closed shape. For example, a rectangular shape can be selected by choosing the two opposite edges of the rectangular area.

Before (or after) the graphical selection of the closed shape, the installer specifies which floor is related to this selection (first floor, second floor, etc.). All of the objects and devices contained in the closed shape are considered by the software as belonging to that floor. The installer specifies the floor characteristics useful for the software simulation, such as ceiling height [H] of the floor, material of the ceiling, etc. Default values can also be proposed or applied.

The installer chooses a point of [RA] that will be the alignment point [AP] or origin of the coordinate system of the floor. The origin can be either inside or outside of the selected shape. In other words, [AP] represents the origin of the two dimensional Cartesian system for the selected shape and, hence, for the floor. The tool 20, 22 provides clear, easy to read and understand visual information for the installer indicating that both [S] and [AP] belong to the same floor along with any other information that might be useful for the user during the installation process. Such information can be provided by a textual label at the origin point and can include, but is not intended to be limited to a description of the floor region or floor characteristics.

The procedure is repeated individually for each floor in the map representation specified by the installer. The result is a set of shape selections i and a set of alignment points or the origins of the respective Cartesian coordinate systems. The installer I can assign the order of the floors on the Z-axis before, during, or after the graphical selections.

If a device or another object involved in the radio system simulation doesn't belong to any selected shape, meaning that it is not assigned to a floor, then the tool 20, 22 can provide a warning indication to the installer and can stop other operations. Alternately, it can assign the item to a default floor, taking into account floor plan options or installer decisions. When the software performs operations requiring positions of the devices and the other objects as input parameters, a process is used to translate the two dimensional coordinates of any object or device into a three dimensional space using information concerning the floors and the alignment points or origins of the respective coordinate systems.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
   graphically displaying a two dimensional first portion of a first floor of a building on a two dimensional visual display unit;
   displaying a device on the two dimensional first portion of the first floor, wherein the device comprises information indicating a device type;
   specifying a floor characteristic, wherein the floor characteristic includes a ceiling height parameter;
   establishing an origin of a first coordinate system;
   establishing an x coordinate and a y coordinate for the device based on the origin;
   providing a floor identifier for the device; and
   establishing a height coordinate for the device by adding heights of a number of floors below the device based on the ceiling height parameter to calculate a floor height parameter and adding an installation location height to the floor height parameter based on the device type to establish the height coordinate,
   wherein the origin is established by receiving a user input specifying a point.

2. The method as in claim 1 further comprising:
   graphically displaying a two dimensional second portion of a second floor of the building on the two dimensional visual display unit;
   presenting a second device on the two dimensional second portion of the second floor;
   establishing a second origin of a second coordinate system; and
   providing a second floor identifier for the second floor.

3. The method as in claim 2 further comprising simulating three dimensional wireless communication by the device and the second device using the first and second coordinate systems.

4. The method as in claim 3 further comprising rearranging the device and the second device.

5. The method as in claim 3 further comprising determining whether the device or the second device is assigned to the first or second floor and, if not, providing a warning of a missing assignment.

6. The method as in claim 3 further comprising assigning an order of the first and second floors.

7. The method as in claim 3 wherein the floor characteristic includes ceiling material.

8. The method as in claim 3 wherein the origin and the second origin are associated with respective closed shapes of an arbitrary configuration.

9. The method as in claim 2 further comprising specifying at least one of ambient condition detectors, intrusion detectors, alarm indicating output devices or audio output units as the device type.

10. A system comprising:
    a two dimensional display unit;
    control circuitry coupled to the two dimensional display unit that establishes a two dimensional representation of first and second floors of a building and, responsive to an input, establishes first and second coordinate systems with one of the first and second coordinate systems associated with each of the first and second floors of the building, wherein the first and second coordinate systems comprise an x dimension, a y dimension, and a height dimension; and
    object display control circuitry coupled to the two dimensional display unit that presents a device on the two dimensional representation of each of the first and second floors, wherein the device is assigned an x coordinate and a y coordinate based on an origin of either of the first or second coordinate systems, wherein the origin is established by receiving user input specifying a point, and wherein the device is assigned a height coordinate by determining a number of floors below the device based on a floor identifier, adding heights of the number of floors below the device based on a ceiling height parameter to calculate a floor height parameter, and adding an installation location height to the floor height parameter based on a device type of the device to establish the height coordinate.

11. The system as in claim 10 further comprising further circuitry to present the device on the two dimensional display unit at a location.

12. The system as in claim 11 further comprising second further circuitry to move the device on the first or second floor and to simulate wireless communication from the device.

13. The system as in claim 12 wherein the device type includes at least one of ambient condition detectors, intrusion detectors, alarm indicating output devices, or audio output units.

14. The system as in claim 10 further comprising further circuitry to simulate wireless communication from the device.

15. An installation aid comprising:
    circuitry that displays, in two dimensions, at least part of a first floor and a second floor providing visual feedback as to a location and a status of a plurality of devices;
    further circuitry that establishes an origin of a coordinate system;
    second further circuitry to modify the location or the status of at least one of the plurality of devices, assign the plurality of devices to the first or second floor, establish an x coordinate and a y coordinate for each of the plurality of devices, and establish a height coordinate for each of the plurality of devices based on a device type and a floor identifier;
    a manually operable input device to select one of the first or second floors, specify the coordinate system for the one of the first or second floors, and display ceiling height related information for the one of the first or second floors; and
    third further circuitry to provide an indicator when any of the plurality of devices is not assigned to either of the first or second floors and to use the manually operable input device to facilitate assignment of each of the plurality of devices,
    wherein the origin of the coordinate system is established by receiving user input specifying a point, and
    wherein the height coordinate for each of the plurality of devices is established by adding heights of a number of floors below a respective one of the plurality of devices based on the ceiling height related information to calculate a floor height parameter and adding an installation location height to the floor height parameter based on the device type of the respective one of the plurality of devices to establish the height coordinate for the respective one of the plurality of devices.

16. The installation aid as in claim 15 wherein the circuitry simulates operational behavior of the plurality of devices in three dimensions.

17. The installation aid as in claim 15 wherein a second coordinate system is specified relative to the second floor.

18. The installation aid as in claim 17 wherein the circuitry simulates operational behavior of the plurality of devices in three dimensions.

19. A system comprising:

a two dimensional display device coupled to control circuitry, wherein the control circuitry establishes a two dimensional representation of first and second floors of a building, wherein, responsive to a first input, first and second coordinate systems are established, wherein, responsive to a second input, an origin is established for each of the first and second coordinate systems, wherein three dimensional information is established relative to a plurality of devices installed on each of the first and second floors, wherein the control circuitry establishes coordinates for each of the plurality of devices, including a height coordinate for each of the plurality of devices based on a device type and a floor identifier, wherein the origin is established for each of the first and second coordinate systems by receiving user input specifying a point within closed boundaries, and wherein the height coordinate for each of the plurality of devices is established by adding heights of a number of floors below a respective one of the plurality of devices based on a ceiling height parameter to calculate a floor height parameter and adding an installation location height to the floor height parameter based on the device type of the respective one of the plurality of devices to establish the height coordinate for the respective one of the plurality of devices.

20. The system as in claim 19 further comprising a manual input device to select the first or second floor and to specify the first or second coordinate systems.

* * * * *